(12) United States Patent
Mazzitelli et al.

(10) Patent No.: US 11,271,989 B2
(45) Date of Patent: Mar. 8, 2022

(54) IDENTIFYING A COMPONENT CLUSTER

(71) Applicant: Red Hat, Inc., Raleigh, NC (US)

(72) Inventors: John J. Mazzitelli, Sicklerville, NJ (US); Heiko W. Rupp, Stuttgart (DE); Jay Shaughnessy, Cherry Hill, NJ (US)

(73) Assignee: Red Hat, Inc., Raleigh, NC (US)

( * ) Notice: Subject to any disclaimer, the term of this patent is extended or adjusted under 35 U.S.C. 154(b) by 544 days.

(21) Appl. No.: 15/277,209

(22) Filed: Sep. 27, 2016

(65) Prior Publication Data

US 2018/0091584 A1 Mar. 29, 2018

(51) Int. Cl.
| | |
|---|---|
| *G06F 15/16* | (2006.01) |
| *H04L 67/10* | (2022.01) |
| *H04L 41/0853* | (2022.01) |
| *H04L 41/12* | (2022.01) |
| *H04L 41/0631* | (2022.01) |

(52) U.S. Cl.
CPC ............ *H04L 67/10* (2013.01); *H04L 41/065* (2013.01); *H04L 41/0853* (2013.01); *H04L 41/12* (2013.01)

(58) Field of Classification Search
CPC ............. G06F 17/30238; G06F 3/1231; H04L 41/0806; H04L 41/0869; H04L 67/10; H04L 41/0803
See application file for complete search history.

(56) References Cited

U.S. PATENT DOCUMENTS

| | | | |
|---|---|---|---|
| 6,973,473 B1 * | 12/2005 | Novaes ................... | G06F 9/465 709/201 |
| 7,233,989 B2 | 6/2007 | Srivastava et al. | |
| 7,321,992 B1 * | 1/2008 | Vellore ................. | G06F 11/004 714/13 |
| 8,627,149 B2 | 1/2014 | Anerousis et al. | |
| 8,996,932 B2 | 3/2015 | Singh et al. | |
| 9,071,537 B2 | 6/2015 | Talla et al. | |
| 9,118,538 B1 | 8/2015 | Lekkalapudi et al. | |

(Continued)

OTHER PUBLICATIONS

Munawar, Mohammad A. et al., "Monitoring Multi-tier Clustered Systems with Invariant Metric Relationships," Proceedings of the 2008 International Workshop on Software Engineering for Adaptive and Self-Managing Systems, SEAMS '08, May 12-13, 2008, pp. 73-80.

(Continued)

*Primary Examiner* — Joon H Hwang
*Assistant Examiner* — Ayele F Woldemariam
(74) *Attorney, Agent, or Firm* — Withrow & Terranova, PLLC

(57) ABSTRACT

Mechanisms for identifying a component cluster among a plurality of components in a distributed computing environment are disclosed. Configuration information that corresponds to the plurality of components is accessed. The configuration information includes inter-component communication information. The inter-component communication information between the plurality of components is matched to determine a plurality of pairs of components that communicate with one another. Relationships between the components in the pairs of components are determined. A data structure that identifies the component cluster of the pairs of components and the relationships between the components in the pairs of components is generated.

21 Claims, 7 Drawing Sheets

(56) References Cited

U.S. PATENT DOCUMENTS

| | | | |
|---|---|---|---|
| 2003/0023721 | A1 | 1/2003 | Vinberg |
| 2011/0173302 | A1* | 7/2011 | Rider ................ G06F 9/44505 |
| | | | 709/220 |
| 2012/0283991 | A1 | 11/2012 | Oliner et al. |
| 2013/0030827 | A1* | 1/2013 | Snyder ................ G06F 19/324 |
| | | | 705/2 |
| 2013/0042139 | A1* | 2/2013 | Bhalerao ............ G06F 11/0709 |
| | | | 714/2 |
| 2013/0091292 | A1* | 4/2013 | Kim ..................... H04W 4/001 |
| | | | 709/230 |
| 2015/0186436 | A1 | 7/2015 | Kumar et al. |
| 2017/0034166 | A1* | 2/2017 | Sonoda ................ G06F 21/44 |

OTHER PUBLICATIONS

Platon, Oana, "View Service Fabric health reports," Microsoft Azure, last updated: Jul. 11, 2016, 35 pages, https://azure.microsoft.com/en-gb/documentation/articles/service-fabric-view-entities-aggregated-health/.

Srivastava, Ashok N. et al., "Machine Learning and Knowledge Discovery for Engineering Systems Health Management," CRC Press, 2012, Boca Raton, Florida, 490 pages.

\* cited by examiner

IDENTIFYING A COMPONENT CLUSTER

TECHNICAL FIELD

The examples relate generally to distributed computing environments that involve multiple components, and in particular to automatically identifying a component cluster of interrelated components.

BACKGROUND

Data processing functions in a distributed computing environment are often distributed among different components, including both software components and hardware components. Consequently, many components in a distributed computing environment often have interrelationships with one another.

SUMMARY

The examples identify relationships between components in a distributed computing environment and generate a data structure that identifies a component cluster of related components based on the relationships. The data structure can be used, for example, to generate imagery that may be presented on a display device that visually depicts the components that compose the component cluster and the relationships between the components of the component cluster.

In one example a method for identifying a component cluster among a plurality of components in a computing environment is disclosed. The method includes accessing, by a computing device comprising a processor device, configuration information that corresponds to the plurality of components, the configuration information comprising inter-component communication information. The method further includes matching the inter-component communication information between the plurality of components to determine a plurality of pairs of components that communicate with one another. The method further includes determining relationships between the components in the pairs of components and generating a data structure that identifies the component cluster of the pairs of components and the relationships between the components in the pairs of components.

In another example a computing device is provided. The computing device includes a memory and a processor device coupled to the memory. The processor device is to access configuration information that corresponds to a plurality of components. The configuration information includes inter-component communication information. The processor device is further to match the inter-component communication information between the plurality of components to determine a plurality of pairs of components that communicate with one another. The processor device is further to determine relationships between the components in the pairs of components and generate a data structure that identifies a component cluster of the pairs of components and the relationships between the components in the pairs of components.

In another example a computer program product for identifying a component cluster among a plurality of components in a computing environment is provided. The computer program product is stored on a non-transitory computer-readable storage medium and includes instructions to cause a processor device to access configuration information that corresponds to the plurality of components. The configuration information includes inter-component communication information. The instructions further cause the processor device to match the inter-component communication information between the plurality of components to determine a plurality of pairs of components that communicate with one another. The instructions further cause the processor device to determine relationships between components in the pairs of components and generate a data structure that identifies the component cluster of the pairs of components and the relationships between the components in the pairs of components.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
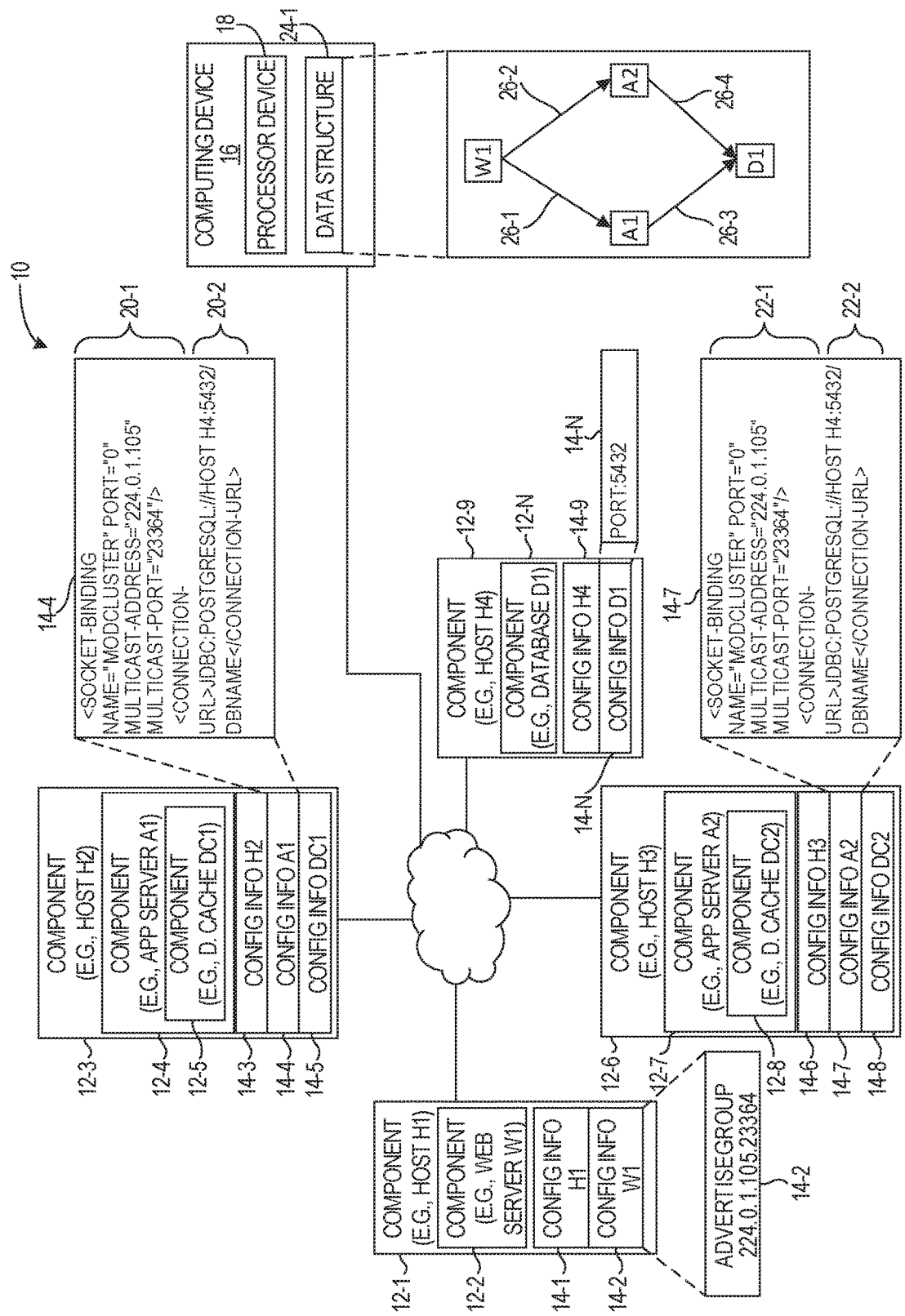
FIG. 1 is a block diagram of a distributed computing environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. As used herein and in the claims, the articles "a" and "an" in reference to an element refers to "one or more" of the element unless otherwise explicitly specified.

Data processing functions in a computing environment are often distributed among different components, including both software components and hardware components. Many components in a distributed computing environment have interrelationships with one another that may not be apparent to an operator of the distributed computing environment. At times, a component may fail. The failure of a component that has relationships with other components may cause the other components to stop working or may negatively impact the performance of one or more of the other components. Sometimes a distributed computing environment maintains an inventory of certain components in the distributed computing environment, such as an inventory of host components, virtual machine components, and even application components. However, the inventory typically does not identify interrelationships between components, and an operator of the distributed computing environment may have no means of determining such interrelationships. Thus, even if an operator of a database component is notified that the database component has failed, the operator may have no way of determining which components utilize the database component and thus which components will be impacted by the failure of the database component.

The disclosed examples automatically identify interrelationships between components in a distributed computing environment. The examples analyze configuration information that comprises inter-component communication information. The examples match inter-component communication information between the components to determine pairs of components that communicate with one another, and, based on such information, generate a data structure that identifies a component cluster of the pairs of components, wherein each component in the component cluster is directly or indirectly related to each other component in the component cluster. The data structure also identifies relationships between the components of the component cluster. The data structure may include a component cluster name that may be displayed to an operator if a component in the component cluster faults. The examples may also use the data structure to generate an image for presentation to the operator that identifies each component in the component cluster and the relationships between the components in the component cluster.

Figure 2:
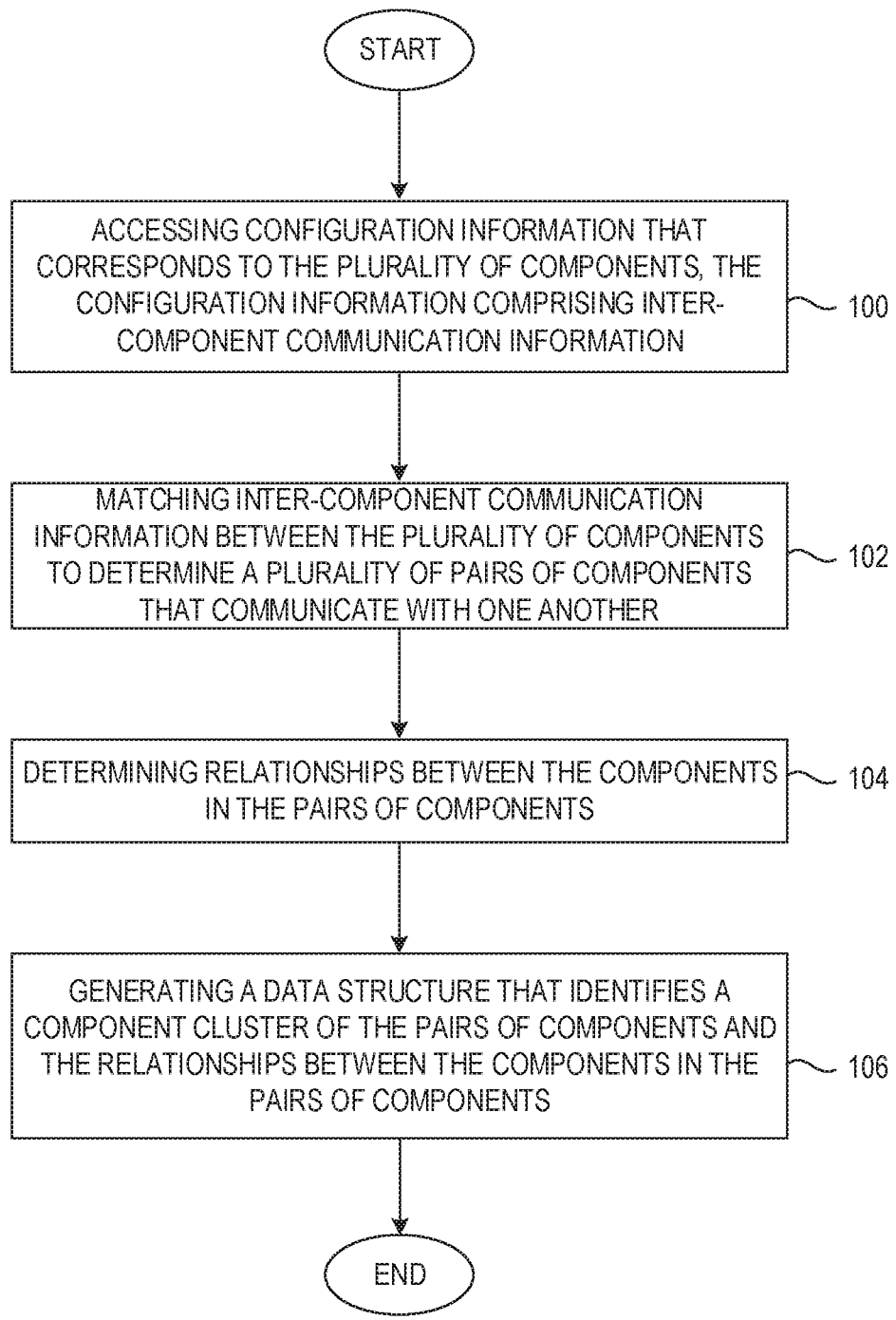
FIG. 2 is a flowchart of a method for identifying a component cluster in the computing environment illustrated in FIG. 1 according to one example.

FIG. 1 is a block diagram of a distributed computing environment 10 in which examples may be practiced. FIG. 2 is a flowchart of a method for identifying a component cluster in the computing environment 10 according to one example. FIGS. 1 and 2 will be discussed in conjunction with one another. The computing environment 10 includes a plurality of components 12-1-12-N (generally, components 12). The term component, as used herein, refers to any discrete processing element in a processing environment, such as a host computer, a virtual machine, an application, a database, a web server, an application server, or the like. Typically, but not necessarily, a component 12 will have an associated communication address, such as an internet protocol (IP) address, a port number, or a combination of an IP address and a port number, via which the component 12 may communicate with other components 12. Each component 12 may also have a component type that may be used, among other things, to identify relationships between the plurality of components 12.

In this example, the component 12-1 is a host computer and thus has a component type of host computer, and has an identifier "H1." For purposes of clarity, the component 12-1 will be hereinafter referred to as the host computer component 12-1. The component 12-2 is a web server and thus has a component type of web server, and has an identifier "W1." The component 12-2 runs on the host computer component 12-1. For purposes of clarity, the component 12-2 will be hereinafter referred to as the web server component 12-2. The component 12-3 is a host computer and thus has a component type of host computer, and has an identifier "H2." For purposes of clarity, the component 12-3 will be hereinafter referred to as the host computer component 12-3. The component 12-4 is an application server and thus has a component type of web server, and has an identifier "A1." The component 12-4 runs on the host computer component 12-3. For purposes of clarity, the component 12-4 will be hereinafter referred to as the application server component 12-4. The component 12-5 is a distributed cache component and thus has a component type of distributed cache, and has an identifier "DC1." The component 12-5 is initiated by the application server component 12-4. For purposes of clarity, the component 12-5 will be hereinafter referred to as the distributed cache component 12-5.

The component 12-6 is a host computer component and thus has a component type of host computer, and has an identifier "H3." For purposes of clarity, the component 12-6 will be hereinafter referred to as the host computer component 12-6. The component 12-7 is an application server component and thus has a component type of web server, and has an identifier "A2." The component 12-7 runs on the host computer component 12-6. For purposes of clarity, the component 12-7 will be hereinafter referred to as the application server component 12-7. The component 12-8 is a distributed cache component and thus has a component type of distributed cache, and has an identifier "DC2." The component 12-8 is initiated by the application server component 12-7. For purposes of clarity, the component 12-8 will be hereinafter referred to as the distributed cache component 12-8.

The component 12-9 is a host computer component and thus has a component type of host computer, and has an identifier "H4." For purposes of clarity, the component 12-9 will be hereinafter referred to as the host computer component 12-9. The component 12-N is a database component and thus has a component type of database, and has an identifier "D1." For purposes of clarity, the component 12-N will be hereinafter referred to as the database component 12-N.

Each of the components 12 has associated configuration information 14-1-14-N (generally, configuration information 14). The configuration information 14 may, in some examples, be maintained in one or more configuration files. For example, the configuration information 14-1 and 14-2 may be maintained in two separate configuration files that are stored on the host computer component 12-1, or stored elsewhere. Alternatively, a single configuration file may maintain the configuration information 14-1 and 14-2 for both of the components 12-1 and 12-2. In other examples, the configuration information 14 may be maintained by a component 12, and provided in response to a request for the configuration information 14 from the component 12.

The computing environment 10 also includes a computing device 16. The computing device 16 includes a processor device 18. Referring now to FIG. 2, in one example, the computing device 16 accesses the configuration information 14 for the plurality of components 12. The configuration information 14 comprises inter-component communication information (FIG. 2, block 100). The term "inter-component communication information" as used herein refers to any information that a component 12 can utilize to communicate with another component 12. Examples of inter-component communication information include an IP address, a port number, a combination of both an IP address and a port number, a host name, or the like.

As an example, the configuration information 14-2 associated with the web server component 12-2 comprises inter-component communication information that includes an ADVERTISEGROUP parameter that identifies an IP address (224.0.1.105) and a port number (23364). The computing device 16 matches inter-component communication information between the plurality of components 12 to determine a plurality of pairs of components 12 that communicate with one another (FIG. 2, block 102). For example, the computing device 16 accesses the configuration information 14-4 associated with the application server component 12-4 and determines that a configuration entry 20-1 in the configuration information 14-4 also comprises inter-component communication information that identifies the same IP address (224.0.1.105) and the same port number (23364) as is identified in the configuration information 14-2. The computing device 16 determines that the inter-component communication information identified in the configuration information 14-2 matches the inter-component communication information identified in the configuration information 14-4, and thus identifies the web server component 12-2 and the application server component 12-4 as a pair of components 12 that communicate with one another.

The computing device 16 also determines a relationship between the components 12 in a pair of components (FIG. 2, block 104). A relationship may identify a functional dependency between the components 12 in a pair of components 12, and/or a family relationship between the components 12 in a pair of components 12, such as a parent-child relationship. For example, because the web server component 12-2 is a component of type web server, and because the application server component 12-4 is a component of type application server, the computing device 16 may determine that the relationship between the web server component 12-2 and the application server component 12-4 is a "SERVES CONTENT FOR" relationship.

Similarly, the computing device 16 accesses the configuration information 14-7 associated with the application server component 12-7 and determines that an entry 22-1 in the configuration information 14-7 comprises inter-component communication information that identifies the same IP address (224.0.1.105) and the same port number (23364) identified in the configuration information 14-2. The computing device 16 determines that the inter-component communication information identified in the configuration information 14-2 matches the inter-component communication information identified in the configuration information 14-7, and thus identifies the web server component 12-2 and the application server component 12-7 as a pair of components 12 that communicate with one another. Again, because the web server component 12-2 is a component of type web server, and because the application server component 12-7 is a component of type application server, the computing device 16 may determine that the relationship between the web server component 12-2 and the application server component 12-7 is a "SERVES CONTENT FOR" relationship.

The computing device 16 accesses the configuration information 14-N associated with the database component 12-N. The computing device 16 determines that the configuration information 14-N includes inter-component communication information that comprises a port number of 5432. The computing device 16 also determines that a configuration entry 20-2 in the configuration information 14-4 identifies inter-component communication information that comprises a hostname of "H4" and a port number of 5432. The computing device 16 determines that the database component 12-N executes on the host computer component 12-9 that has an identifier of "H4." The computing device 16 determines that the inter-component communication information identified in the configuration entry 20-2 matches the inter-component communication information identified in the configuration information 14-N, and thus that the web server component 12-2 and the database component 12-N are a pair of components 12 that communicate with one another. Because the application server component 12-4 is a component of type application server, and because the database component 12-N is a component of type database, the computing device 16 may determine that the relationship between the application server component 12-4 and the database component 12-N is a "STORES DATA TO" relationship.

Similarly, the computing device 16 determines that an entry 22-2 in the configuration information 14-7 identifies inter-component communication information that comprises a hostname of "H4" and a port number of 5432. The computing device 16 determines that the database component 12-N executes on the host computer component 12-9 that has an identifier of "H4." The computing device 16 determines that the inter-component communication information identified in the entry 22-2 matches the inter-component communication information identified in the configuration information 14-N, and thus that the application server component 12-7 and the database component 12-N are a pair of components 12 that communicate with one another. Because the application server component 12-7 is a component of type application server, and because the database component 12-N is a component of type database, the computing device 16 may determine that the relationship between the application server component 12-7 and the database component 12-N is a "STORES DATA TO" relationship.

The computing device 16 generates a data structure 24-1 that identifies a component cluster of the pairs of components 12 and relationships 26-1-26-4 between the components 12 in the pairs of components 12 (FIG. 2, block 106). In some examples, each component 12 in the component cluster is directly or indirectly related to each other component 12 in the component cluster. As an example of an identified relationship between a pair of components 12, the data structure 24-1 may identify a relationship 26-1 between the web server component 12-2 and the application server component 12-4 as a "SERVES CONTENT FOR" relationship. Similarly, the data structure 24-1 may identify a relationship 26-2 between the web server component 12-2 and the application server component 12-7 as a "SERVES CONTENT FOR" relationship. The data structure 24-1 may identify a relationship 26-3 between the application server component 12-4 and the database component 12-N as a "STORES DATA TO" relationship. The data structure 24-1 may also identify a relationship 26-4 between the application server component 12-7 and the database component 12-N as a "STORES DATA TO" relationship.

As will be discussed in greater detail below, the computing device 16 may subsequently access the data structure 24-1 for any number of reasons. For example, if the application server component 12-4 faults, the computing device 16 may access the data structure 24-1, determine that the application server component 12-7 is still operational, and display a message informing an operator that the application server component 12-4 has faulted and services provided by the web server component 12-2 may be degraded.

Figure 3:
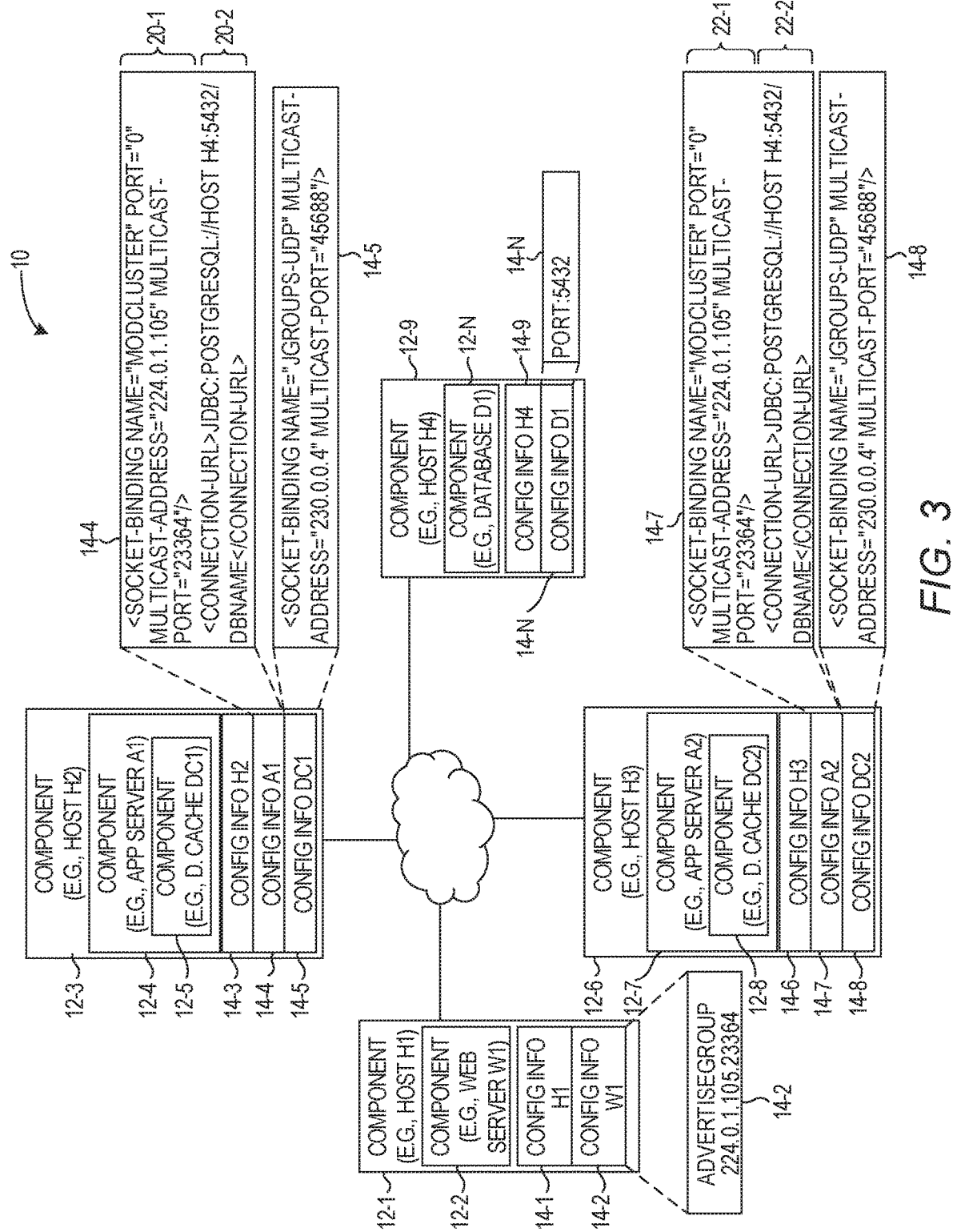
FIG. 3 is a block diagram illustrating additional details of the distributed computing environment shown in FIG. 2 according to one example.
Figure 4:
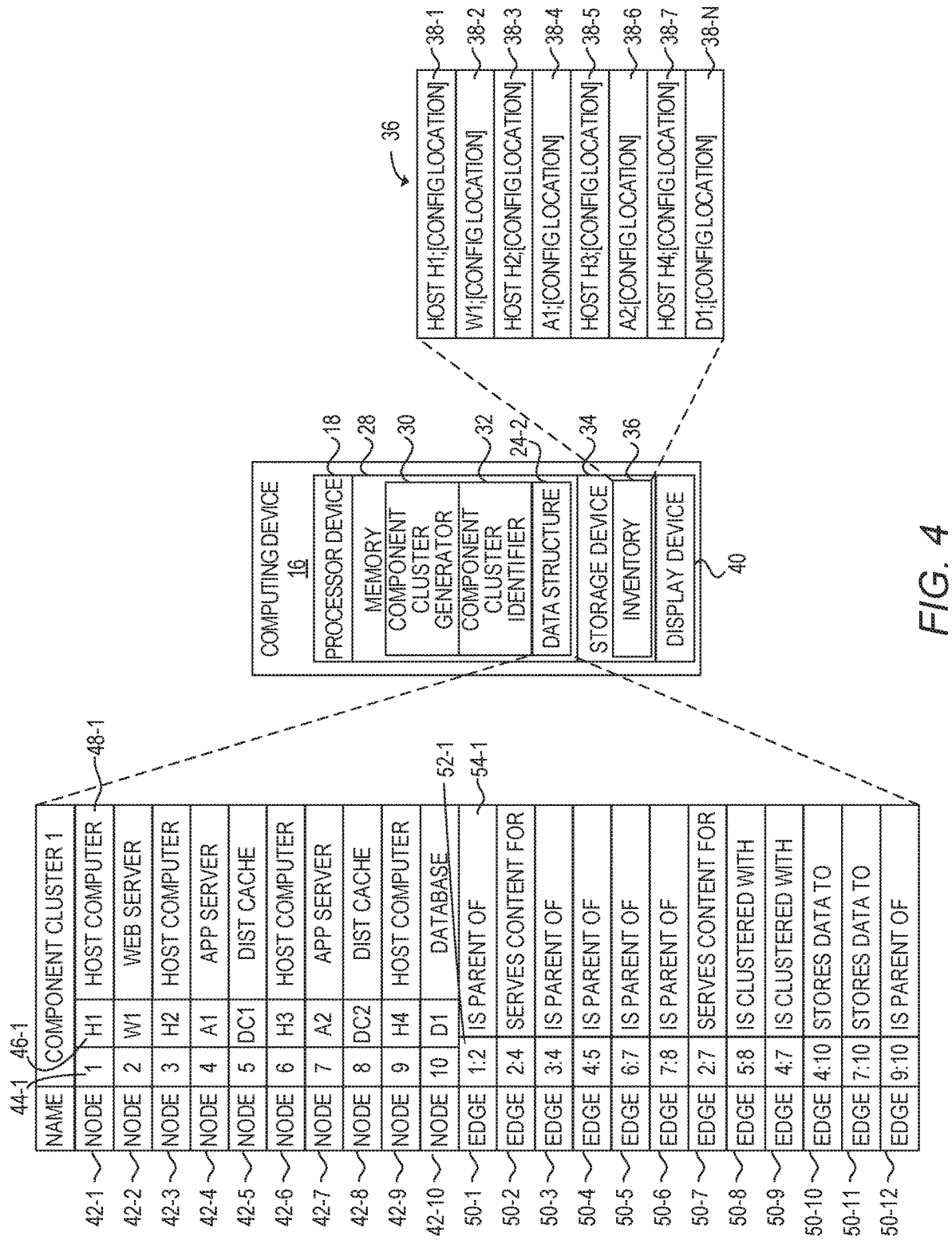
FIG. 4 is a block diagram illustrating a data structure that identifies a component cluster of components generated based on configuration information illustrated in FIG. 3 according to one example.

FIG. 3 is a block diagram illustrating additional details of the distributed computing environment 10 shown in FIG. 2 according to one example. FIG. 4 is a block diagram illustrating a data structure 24-2 generated by the computing device 16 based on the configuration information 14 illustrated in FIG. 3 that identifies a component cluster of components 12 according to one example. FIGS. 3 and 4 will be discussed in conjunction with one another. In this example, the computing device 16 includes a memory 28 and a component cluster generator 30. The component cluster generator 30 comprises digital logic and instructions which, when executed by the processor device 18, may implement aspects of the functionality related to generating the data structure 24-2, such as illustrated in FIG. 2, and as discussed in greater detail herein. The memory 28 may also include a component cluster identifier 32 that comprises digital logic and instructions which, when executed by the processor device 18, may access the data structure 24-2 upon the occurrence of certain events, such as upon request by an operator, in response to a fault by a specific component 12, or in response to other events. Because the component cluster generator 30 and the component cluster identifier 32 are elements of the computing device 16, functionality implemented by the component cluster generator 30 or the component cluster identifier 32 may be attributed to the computing device 16 generally. Moreover, in examples where the component cluster generator 30 and the component cluster identifier 32 comprise software instructions that program the processor device 18 to carry out functionality discussed herein, functionality implemented by the component cluster generator 30 or the component cluster identifier 32 may be attributed herein to the processor device 18.

The computing device 16 also includes, or is communicatively coupled to, a storage device 34. The storage device 34 may include an inventory 36 that identifies one or more of the components 12. In some examples, the inventory 36 may also be maintained in the memory 28, or may be maintained in both the storage device 34 and the memory 28. The inventory 36 may be generated by a system manager (not illustrated) that maintains information about certain components 12. This information may be generated, for example, when a new host computer component 12 is added to the computing environment 10, when a new application server component 12 is initiated in the computing environment 10, when a new database component 12 is initiated in the computing environment 10, and the like. The inventory 36 may comprise a plurality of records 38-1-38-N (generally, records 38), each of which corresponds to a particular component 12. However, as will be discussed in greater detail below, in some examples the inventory 36 may not identify each component 12 in the computing environment 10. Each record 38 may contain information related to the particular component 12 to which the record 38 corresponds, such as a component identifier of the component 12 and such as configuration location information that identifies where configuration information 14 that is associated with the particular component 12 can be obtained. For example, a record 38 may identify a file name and a file location of a configuration file that contains the configuration information 14. Alternatively, the record 38 may indicate a function, method, or other programmatic interface by which the configuration information 14 may be obtained.

The computing device 16 may also include a display device 40 that may be used, for example, to provide information to an operator upon the occurrence of certain events. In one example, the computing device 16 generates the data structure 24-2 based in part on information maintained in the inventory 36. For example, the computing device 16 may access the record 38-1 and determine the location of the configuration information 14-1 based on the record 38-1. In this example, assume that the record 38-1 identifies a configuration file on the host computer component 12-1 as the location of the configuration information 14-1. The computing device 16 accesses the configuration file and obtains the configuration information 14-1. The computing device 16 generates a data structure node 42-1 that contains information that corresponds to the host computer component 12-1, such as, by way of non-limiting example, a unique node identifier 44-1 (e.g., 1), an identifier 46-1 of the host computer component 12-1 (e.g., "H1"), and a component type 48-1 (e.g., "HOST COMPUTER"). The identifier 46-1 may be obtained, for example, from the record 38-1, or from the configuration information 14-1, for example. Similarly, the component type 48-1 may be obtained, for example, from the record 38-1, or from the configuration information 14-1.

The configuration information 14-1 may identify the web server component 12-2. In another example, the computing device 16 may issue a request to the host computer component 12-1 that the host computer component 12-1 identify any components 12 that are executing on the host computer component 12-1. The host computer component 12-1 may respond with information that identifies the web server component 12-2. In another example, the inventory 36 may contain a record 38-2 that identifies the web server component 12-2 and indicates that the web server component 12-2 is associated with the host computer component 12-1.

The computing device 16 generates a data structure node 42-2 that contains a unique node identifier, an identifier of the web server component 12-2 (e.g., "W1"), and a component type (e.g., "WEB SERVER"). The computing device 16 also generates a data structure edge 50-1 that identifies a relationship between the host computer component 12-1 and the web server component 12-2. The data structure edge 50-1 contains a component pair identifier 52-1 that identifies the host computer component 12-1 and the web server component 12-2 by their respective unique node identifiers, and a relationship identifier 54-1 that identifies the relationship of the host computer component 12-1 to the web server component 12-2 as an "IS PARENT OF" relationship.

The computing device 16, in a similar fashion, obtains similar information regarding the host computer component 12-3 ("H2") and the application server component 12-4 ("A1"). It should be noted that the computing device 16 may not initially add the data structure nodes 42-3-42-4 to the data structure 24-2 because at this point the relationship between web server component 12-2 and the application server component 12-4 may not have been identified. The computing device 16, as discussed above with regard to FIGS. 1 and 2 ultimately accesses the configuration information 14-2 associated with the web server component 12-2 and the configuration information 14-4 associated with the application server component 12-4, and determines that the inter-component communication information that comprises an IP address (224.0.1.105) and a port number (23364) match. The computing device 16 then adds the data structure nodes 42-3-42-4 to the data structure 24-2.

The computing device 16 also generates a data structure edge 50-2 that identifies the web server component 12-2 and the application server component 12-4 as a pair of components 12 that communicate with one another. The computing device 16 also identifies, in the data structure edge 50-2, a relationship from the web server component 12-2 to the application server component 12-4 as a "SERVES CONTENT FOR" relationship. The relationships described herein may be predetermined and based on the types of components 12 that have matching inter-component communication information. For example, the storage device 34 may include a configurable relationship table (not illustrated) that indicates the relationship between a web server component 12 and an application server component 12 that have matching inter-component communication information should be designated as having a "SERVES CONTENT FOR" relationship. The configurable relationship table may indicate the relationship between an application server component 12 and a database component 12 should be designated as a "STORES DATA TO" relationship. The configurable relationship table may indicate the relationship between two components 12 of the same type that share inter-component communication information should be designated as having an "IS CLUSTERED WITH" relationship. It will be apparent that such relationships are merely examples, and any number of relationships between components 12 may be defined as desired.

The computing device 16 also generates a data structure edge 50-3 that identifies a relationship between the host computer component 12-3 and the application server component 12-4 as an "IS PARENT OF" relationship.

In one example, the computing device 16 may, with regard to certain component types, request from some components 12 information regarding child components. For example, the computing device 16 may request from the application server component 12-4 child component information that identifies child components of the application server component 12-4. In this example, application server component 12-4 responds with child component information that identifies the distributed cache component 12-5 ("DC1"). The computing device 16 generates a data structure node 42-5 that contains a unique node identifier, an identifier of the distributed cache component 12-5 (e.g., "DC1"), and a component type (e.g., "DISTRIBUTED CACHE").

The response may also identify the configuration information 14-5 that is associated with the distributed cache component 12-5, or with information that identifies a location of the configuration information 14-5. The computing device 16 generates a data structure edge 50-4 that identifies a relationship between the application server component 12-4 and the distributed cache component 12-5. The data structure edge 50-4 contains a component pair identifier that identifies the application server component 12-4 and the distributed cache component 12-5 by their respective unique node identifiers (e.g., "4:5"), and a relationship identifier that identifies a relationship of the application server component 12-4 to the distributed cache component 12-5 as an "IS PARENT OF" relationship.

The computing device 16 generates data structure nodes 42-6-42-8 using similar processing to identify, in the data structure 24-2, the host computer component 12-6, the application server component 12-7, and the distributed cache component 12-8. The computing device 16 adds a data structure edge 50-5 to identify the relationship between the host computer component 12-6 and the application server component 12-7 as an "IS PARENT OF" relationship. The computing device 16 adds a data structure edge 50-6 to identify the relationship between the application server component 12-7 and the distributed cache component 12-8 as an "IS PARENT OF" relationship. The computing device 16 adds a data structure edge 50-7 to identify a relationship between web server component 12-2 and the application server component 12-7 as a "SERVES CONTENT FOR" relationship.

The computing device 16 determines that the configuration information 14-5 associated with the distributed cache component 12-5 identifies inter-component communication information comprising an IP address (230.0.0.4) and a port (45688). The computing device 16 also determines that the configuration information 14-8 associated with the distributed cache component 12-8 identifies inter-component communication information comprising the same IP address (230.0.0.4) and the same port (45688) and determines that the distributed cache component 12-5 and the distributed cache component 12-8 are a pair of components 12 that communicate with one another. Based on these determinations, the computing device 16 adds a data structure edge 50-8 to identify a relationship between the distributed cache component 12-5 and the distributed cache component 12-8 as an "IS CLUSTERED WITH" relationship.

Similarly, the computing device 16 determines that the configuration information 14-4 associated with the application server component 12-4 identifies inter-component communication information comprising an IP address (224.0.1.105) and a port (0). The computing device 16 also determines that the configuration information 14-7 associated with the application server component 12-7 identifies inter-component communication information comprising the same IP address (224.0.1.105) and the same port (0), and determines that the application server component 12-4 and the application server component 12-7 are a pair of components 12 that communicate with one another. The computing device 16 may also determine that each contains the same SOCKET-BINDING NAME parameter of "MODCLUSTER". Based on these determinations, the computing device 16 adds a data structure edge 50-9 to identify a relationship between the application server component 12-4 and the application server component 12-7 as an "IS CLUSTERED WITH" relationship.

The computing device 16 generates data structure nodes 42-9 and 42-10 using similar processing to identify, in the data structure 24-2, the host computer component 12-9 and the database component 12-N. As discussed above regarding FIGS. 1 and 2, the computing device 16 adds a data structure edge 50-10 to identify a relationship between the application server component 12-4 and the database component 12-N as a "STORES DATA TO" relationship. The computing device 16 adds a data structure edge 50-11 to identify a relationship between the application server component 12-7 and the database component 12-N as a "STORES DATA TO" relationship. The computing device 16 adds a data structure edge 50-12 to identify the relationship between the host computer component 12-9 and the database component 12-N as an "IS PARENT OF" relationship.

In operation, the computing device 16 may analyze hundreds or thousands of components 12. From such analysis, many component clusters may be identified, and corresponding data structures 24 may be generated. Each data structure 24 identifies a component cluster of components 12 that are each directly or indirectly related to one another.

Figure 5:
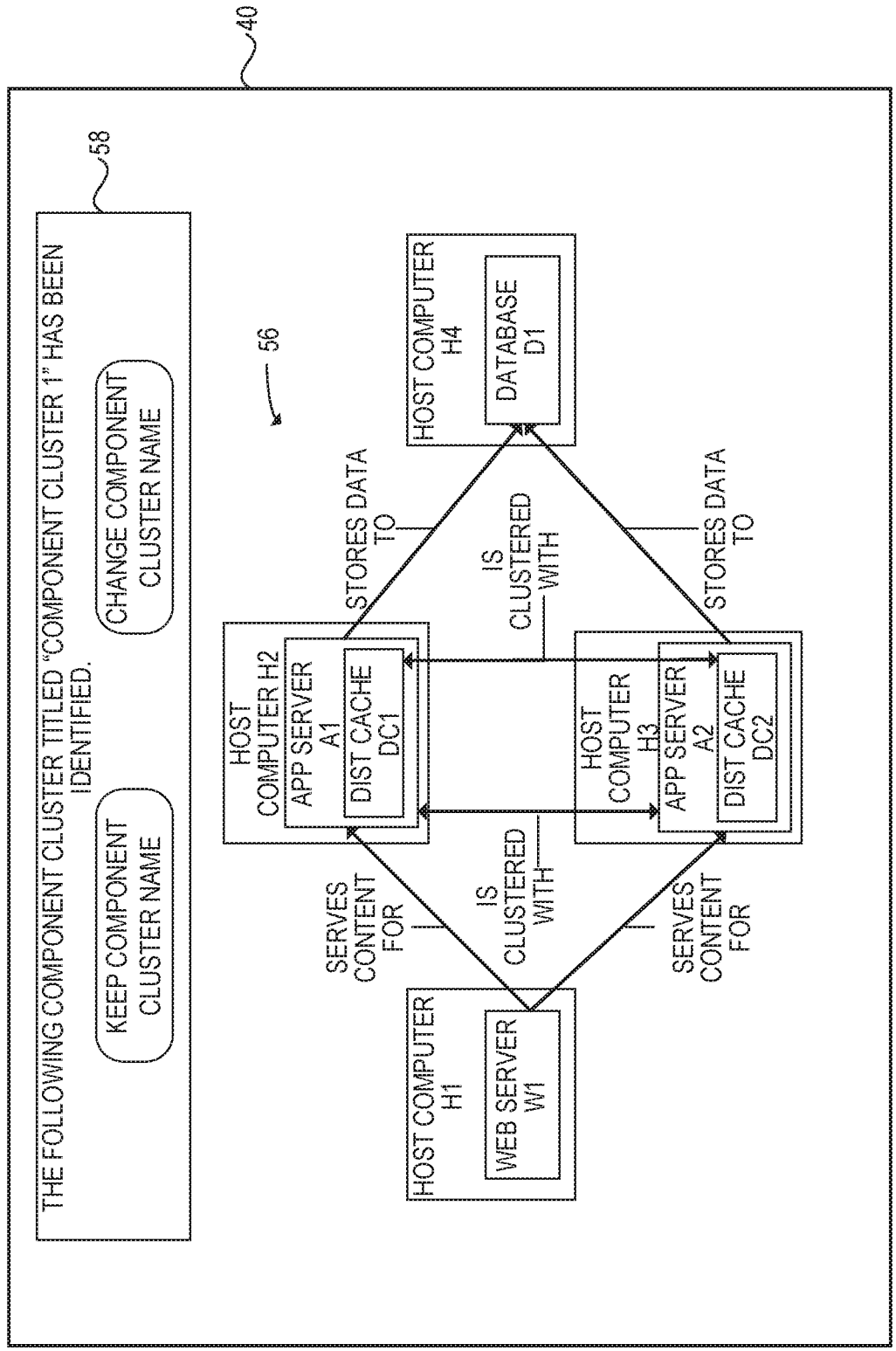
FIG. 5 illustrates an image that may be generated based on a data structure that visualizes a component cluster identified by the data structure according to one example.

FIG. 5 illustrates an image 56, which may be generated based on the data structure 24-2, that visualizes the component cluster identified by the data structure 24-2 according to one example. In this example, after generating the data structure 24-2, the computing device 16 generates the image 56 based on the data structure nodes 42 and the data structure edges 50, and presents the image 56 on the display device 40. The image 56 identifies each component 12 in the component cluster by type (e.g., HOST COMPUTER) and identifier (e.g., H1). The image 56 also identifies the relationships between the components 12 in the component cluster. The "IS PARENT OF" relationship may be illustrated implicitly, as depicted, or explicitly. In one example, the computing device 16 may generate a dialog box 58 that allows an operator to give the component cluster a desired name or identifier. For purposes of illustration, assume that the operator changes the component cluster name to "VENDOR DISBURSEMENT APPLICATION." The computing device 16 may then store this name in the data structure 24-2 and utilize this name when subsequently visualizing the component cluster identified by the data structure 24-2.

Figure 6:
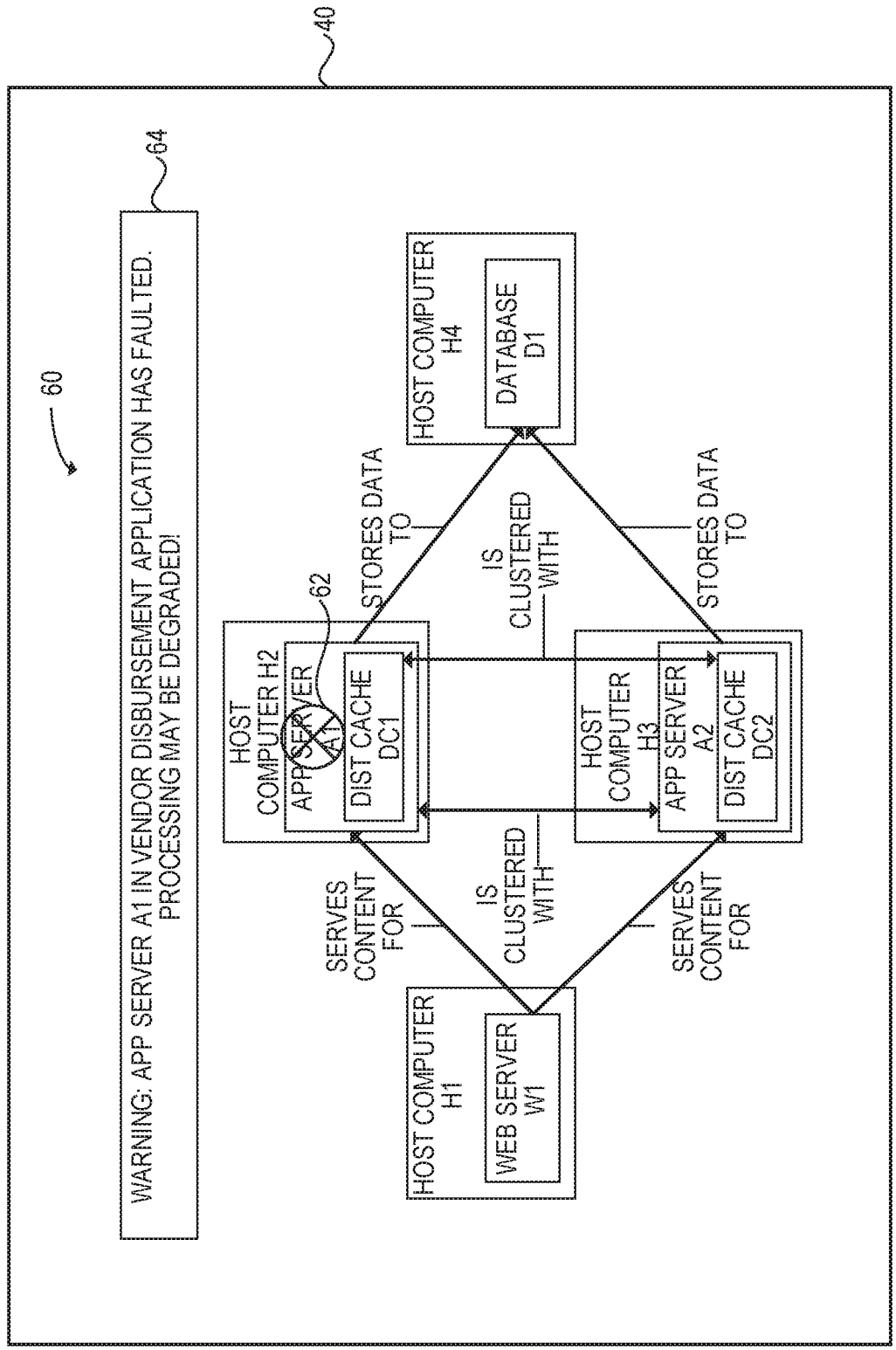
FIG. 6 illustrates an image that may be presented on a display device upon the occurrence of a fault of a component.

FIG. 6 illustrates an image 60 that may be presented on the display device 40 upon the occurrence of a fault of a component 12. In particular, in one example, upon the occurrence of a fault of a component 12, such as the abnormal termination of a component 12, the component cluster identifier 32 (FIG. 4) may be invoked to determine whether the component 12 is part of a component cluster. In this example, assume that the application server component 12-4 faults, such as by terminating abnormally. The component cluster identifier 32 accesses the data structure nodes 42 of the data structure 24-2 and determines that the application server component 12-4 is a component 12 in the component cluster identified by the data structure 24-2. The component cluster identifier 32 also determines that the application server component 12-4 is in a cluster with the application server component 12-7. The component cluster identifier 32 may request system information from the host computer component 12-6 and determine that the application server component 12-7 is processing normally. The component cluster identifier 32 may thus determine that the processing implemented by the component cluster may simply be degraded rather than halted because the application server component 12-7 may take over processing for the application server component 12-4.

The component cluster identifier 32 generates the image 60 that visualizes the component cluster identified by the data structure 24-2, similar to the image 56 discussed above. The image 60 may identify, such as by an appropriate designator 62, that the application server component 12-4 has faulted. The image 60 may also include a message 64 that indicates the name of the component cluster (e.g., "VENDOR DISBURSEMENT APPLICATION"), so that the operator is aware of which component cluster is impacted, and that informs the operator that processing associated with the component cluster may be degraded.

Figure 7:
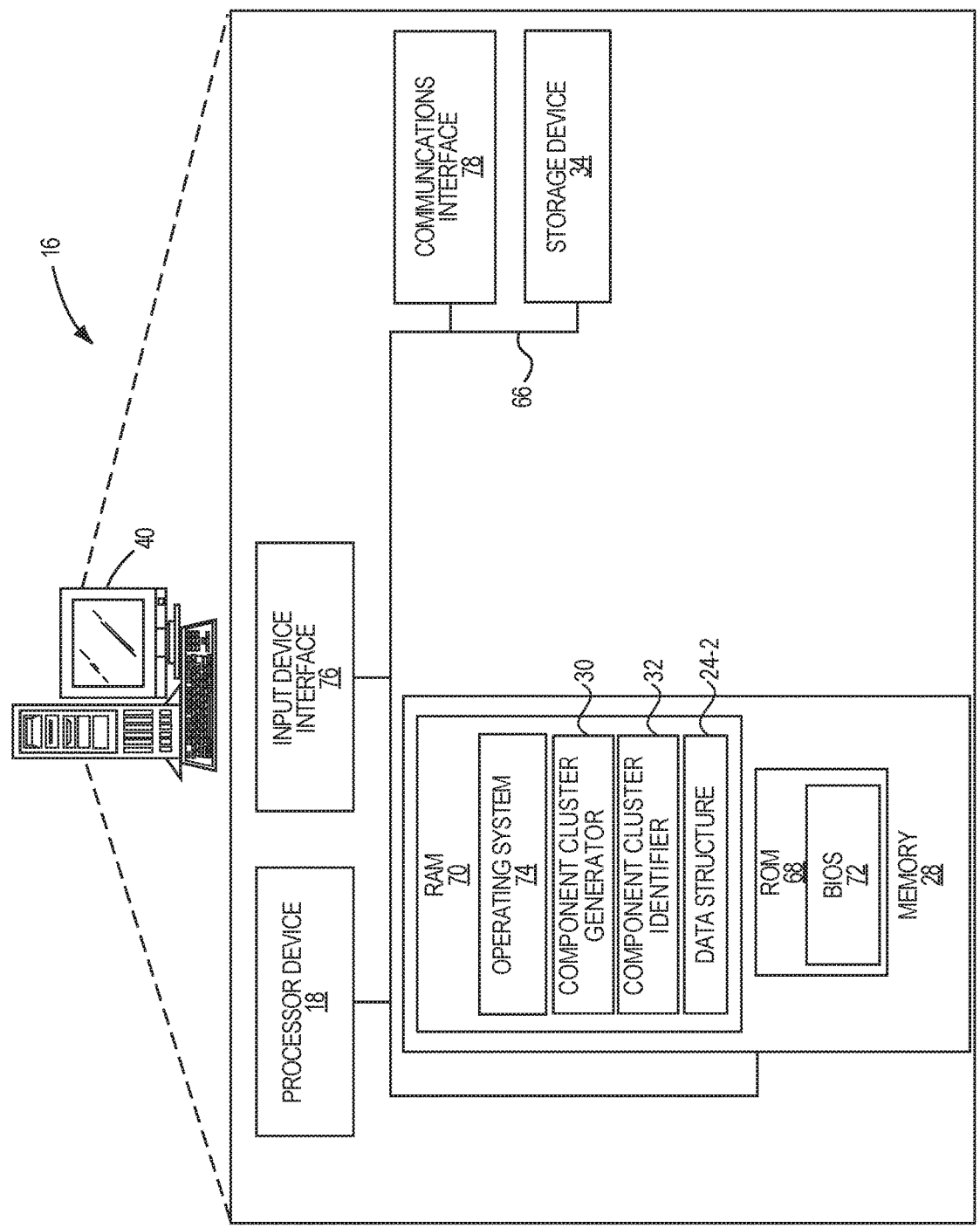
FIG. 7 is a block diagram of the computing device suitable for implementing examples.

FIG. 7 is a block diagram of the computing device 16 suitable for implementing examples according to one example. The computing device 16 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 16 includes the processor device 18, the memory 28, and a system bus 66. The system bus 66 provides an interface for system components including, but not limited to, the memory 28 and the processor device 18. The processor device 18 can be any commercially available or proprietary processor.

The system bus 66 may be any of several types of bus structures that may further interconnect to a memory bus (with or without a memory controller), a peripheral bus, and/or a local bus using any of a variety of commercially available bus architectures. The memory 28 may include non-volatile memory 68 (e.g., read-only memory (ROM), erasable programmable read-only memory (EPROM), electrically erasable programmable read-only memory (EEPROM), etc.), and volatile memory 70 (e.g., random-access memory (RAM)). A basic input/output system (BIOS) 72 may be stored in the non-volatile memory 68 and can include the basic routines that help to transfer information between elements within the computing device 16. The volatile memory 70 may also include a high-speed RAM, such as static RAM, for caching data.

The computing device 16 may further include or be coupled to a non-transitory computer-readable storage medium such as the storage device 34, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 34 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of executable processes can be stored in the storage device 34 and in the volatile memory 70, including an operating system 74 and one or more executable processes, such as the component cluster generator 30 and the component cluster identifier 32, which may implement the functionality described herein in whole or in part. It is to be appreciated that the examples can be implemented with various commercially available operating systems 74 or combinations of operating systems 74.

All or a portion of the examples may be implemented as a computer program product stored on a transitory or non-transitory computer-usable or computer-readable storage medium, such as the storage device 34, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18. The processor device 18, in conjunction with the component cluster generator 30 in the volatile memory 70, may serve as a controller, or control system, for the computing device 16 that is to implement the functionality described herein.

An operator may also be able to enter one or more configuration commands through a keyboard (not illustrated), a pointing device such as a mouse (not illustrated), or a touch-sensitive surface such as the display device 40. Such input devices may be connected to the processor device 18 through an input device interface 76 that is coupled to the system bus 66 but can be connected by other interfaces such as a parallel port, an Institute of Electrical and Electronic Engineers (IEEE) 1394 serial port, a Universal Serial Bus (USB) port, an IR interface, and the like.

The computing device 16 may also include a communications interface 78 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method for identifying a component cluster among a plurality of components in a distributed computing environment, comprising:

accessing, by a computing device comprising a processor device, configuration information that corresponds to the plurality of components, the configuration information comprising inter-component communication information, wherein the inter-component communication information comprises one or more of an Internet Protocol (IP) address, a port number, a combination of both an IP address and a port number, and a host name;

identifying, in the inter-component communication information of the plurality of components, matching inter-component communication information to determine a plurality of pairs of components that communicate with one another;

determining, for each respective pair of components of the plurality of pairs of components, a relationship between the components in the respective pair of components; and generating a data structure that identifies the component cluster of the pairs of components and the relationship between the components in each of the pairs of components.

2. The method of claim 1 wherein generating the data structure further comprises generating the data structure that identifies the component cluster of the pairs of components and the relationship between the components in each of the pairs of components, wherein each component in the component cluster is directly or indirectly related to each other component in the component cluster.

3. The method of claim 1 further comprising accessing an inventory structure that identifies the plurality of components.

4. The method of claim 3 further comprising:
determining a location of a plurality of configuration files based on the inventory structure; and
wherein accessing the configuration information that corresponds to the plurality of components comprises accessing, for at least some of the plurality of components, a corresponding configuration file of the plurality of configuration files, the corresponding configuration file comprising corresponding configuration information identifying one or more inter-component communication channels.

5. The method of claim 4 wherein accessing the configuration information that corresponds to the plurality of components further comprises sending, to at least one component, a request for the configuration information, and receiving, in response to the request, the configuration information from the at least one component.

6. The method of claim 1 further comprising:
requesting, from at least one component, child component information that identifies child components of the at least one component;
receiving, from the at least one component, the child component information;
processing the child component information and identifying a child component that is absent from the data structure; and
modifying the data structure to identify the child component and to identify that the child component is a child component of the at least one component.

7. The method of claim 1 wherein generating the data structure comprises:
generating the data structure to include a plurality of nodes, each node corresponding to one of the components in the component cluster; and
generating a plurality of edges, each edge connecting two nodes and identifying a relationship of a plurality of relationships between two components that correspond to the two nodes.

8. The method of claim 7 wherein an edge identifies one of a "SERVES CONTENT FOR," a "STORES DATA TO," and an "IS CLUSTERED WITH" relationship.

9. The method of claim 1 further comprising:
accessing the data structure;
generating, based on the data structure, an image that identifies each component identified in the component cluster, and the relationship between the components in each of the pairs of components in the component cluster; and
presenting the image on a display device.

10. The method of claim 9 wherein the image identifies the relationship between the components in each of the pairs of components via textual indicia that textually describe the relationship between the components in each of the pairs of components.

11. The method of claim 1 further comprising:
determining that a particular component has terminated abnormally;
in response to determining that the particular component has terminated abnormally, determining that the particular component is identified in the data structure;
determining, based on the data structure, a cluster name associated with the data structure; and
presenting on a display device information that indicates that the particular component has terminated abnormally, and that identifies the cluster name.

12. The method of claim 11 further comprising presenting on the display device an image that identifies each component identified in the data structure, and the relationships between the components in each of the pairs of components identified in the data structure.

13. The method of claim 11 further comprising:
determining, based on the data structure, that the particular component is one of at least two components in a subset of components that share requests; and
presenting on the display device information that indicates processing may be degraded because the particular component has terminated abnormally.

14. The method of claim 1 wherein the data structure further identifies, for at least one of the components in the component cluster, a component type.

15. The method of claim 1 further comprising:
determining a cluster name that identifies the component cluster;
presenting the cluster name on a display device;
receiving input that contains a new cluster name; and
storing the new cluster name in conjunction with the data structure.

16. A computing device, comprising:
a memory;
a processor device coupled to the memory to:
access configuration information that corresponds to a plurality of components, the configuration information comprising inter-component communication information, wherein the inter-component communication information comprises one or more of an Internet Protocol (IP) address, a port number, a combination of both an IP address and a port number, and a host name;
identify, in the inter-component communication information of the plurality of components, matching inter-component communication information to determine a plurality of pairs of components that communicate with one another;

determine, for each respective pair of components of the plurality of pairs of components, a relationship between the components in the respective pair of components; and generate a data structure that identifies a component cluster of the pairs of components and the relationship between the components in each of the pairs of components.

17. The computing device of claim 16 wherein the processor device is further to:

access an inventory structure that identifies the plurality of components;

determine a location of a plurality of configuration files based on the inventory structure; and access, for at least some of the plurality of components, a corresponding configuration file of the plurality of configuration files, the corresponding configuration file comprising corresponding configuration information identifying one or more inter-component communication channels.

18. The computing device of claim 16 wherein to generate the data structure the processor device is further to:

generate the data structure to include a plurality of nodes, each node corresponding to one of the components in the component cluster; and generate a plurality of edges, each edge connecting two nodes and identifying a relationship of a plurality of relationships between two components that correspond to the two nodes.

19. The computing device of claim 16 wherein the processor device is further to:

access the data structure;

generate, based on the data structure, an image that identifies each component identified in the component cluster, and the relationship between the components in each of the pairs of components in the component cluster; and present the image on a display device.

20. A computer program product for identifying a component cluster among a plurality of components in a distributed computing environment, the computer program product stored on a non-transitory computer-readable storage medium and including instructions to cause a processor device to:

access configuration information that corresponds to the plurality of components, the configuration information comprising inter-component communication information, wherein the inter-component communication information comprises one or more of an Internet Protocol (IP) address, a port number, a combination of both an IP address and a port number, and a host name;

identify, in the inter-component communication information of the plurality of components, matching inter-component communication information to determine a plurality of pairs of components that communicate with one another;

determine, for each respective pair of components of the plurality of pairs of components, a relationship between the components in the respective pair of components; and generate a data structure that identifies a component cluster of the pairs of components and the relationship between the components in each of the pairs of components.

21. The computer program product of claim 20 wherein the instructions are further to cause the processor device to:

access an inventory structure that identifies the plurality of components;

determine a location of a plurality of configuration files based on the inventory structure; and access, for at least some of the plurality of components, a corresponding configuration file of the plurality of configuration files, the corresponding configuration file comprising corresponding configuration information identifying one or more inter-component communication channels.

* * * * *